US 8,532,700 B2

(12) United States Patent
Parlamas et al.

(10) Patent No.: US 8,532,700 B2
(45) Date of Patent: Sep. 10, 2013

(54) METHOD AND APPARATUS FOR ACCESSING A NETWORK SERVICE

(75) Inventors: Stephanie P. Parlamas, Colts Neck, NJ (US); Christina I. Cacioppo, Freehold, NJ (US); Min Lu, Freehold, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 245 days.

(21) Appl. No.: 12/628,407

(22) Filed: Dec. 1, 2009

(65) Prior Publication Data

US 2011/0130167 A1    Jun. 2, 2011

(51) Int. Cl.
*H04M 1/00* (2006.01)
*H04B 1/38* (2006.01)

(52) U.S. Cl.
USPC ..................................... 455/552.1; 455/557

(58) Field of Classification Search
USPC ............. 455/552.1, 426.1, 445, 550.1, 553.1, 455/556.1–556.2, 557, 414.1, 418–420; 370/338, 328
See application file for complete search history.

(56) References Cited

U.S. PATENT DOCUMENTS

| | | | |
|---|---|---|---|
| 7,110,789 B1* | 9/2006 | Curtiss et al. | 455/556.1 |
| 7,493,146 B1* | 2/2009 | Delker et al. | 455/567 |
| 7,496,360 B2* | 2/2009 | Sindhwani et al. | 455/422.1 |
| 8,005,505 B2* | 8/2011 | Parry | 455/556.1 |
| 8,090,374 B2* | 1/2012 | Rezvani et al. | 455/437 |
| 2003/0078071 A1* | 4/2003 | Uchiyama | 455/557 |
| 2006/0166674 A1* | 7/2006 | Bennett et al. | 455/445 |
| 2007/0049329 A1* | 3/2007 | Mayer et al. | 455/552.1 |
| 2007/0155427 A1* | 7/2007 | Tran | 455/556.2 |
| 2007/0167157 A1* | 7/2007 | Hundal | 455/426.1 |
| 2007/0297373 A1* | 12/2007 | Saifullah et al. | 370/338 |
| 2008/0020747 A1* | 1/2008 | McQuaide | 455/423 |
| 2009/0075654 A1* | 3/2009 | Lu et al. | 455/435.2 |

* cited by examiner

*Primary Examiner* — Brandon R Miller (57) ABSTRACT

A method and apparatus for initiating a call are disclosed. For example, the method receives via a tri-mode mobile endpoint device a request for initiating a call and a selection of an access mode from a user, wherein the tri-mode mobile endpoint device is capable of operating in a cellular mode, a Wi-Fi mode, and a wire-based mode for initiating the call. The method then provides the call using the selection of the access mode.

16 Claims, 5 Drawing Sheets

METHOD AND APPARATUS FOR ACCESSING A NETWORK SERVICE

The present disclosure relates generally to communication networks and, more particularly, to a method and apparatus for enabling access to various network services, e.g., a wireless network service, an enterprise network service, and/or a wire-based network service, using a single tri-mode device.

BACKGROUND

The need for mobility has led some enterprise customers to extend services developed for the enterprise network to wireless devices. For example, an enterprise customer may develop a client application that emulates the wire-based service experience (e.g., the enterprise network experience). The client application may then be implemented on wireless devices. However, the client application typically only supports the enterprise service with dual mode access: access via a cellular network (e.g., GSM or UMTS), or access via a wireless fidelity (Wi-Fi) network. As a result, based on the type of access technology that is available, the user will have to use a corresponding phone with the specific access technology. In other words, the customer ends up with multiple phones to be selectively used, based on the customer's physical location and the particular access technology available at that location.

SUMMARY

In one embodiment, the present disclosure discloses a method and apparatus for initiating a call. For example, the method receives via a tri-mode mobile endpoint device a request for initiating a call and a selection of an access mode from a user, wherein the tri-mode mobile endpoint device is capable of operating in a cellular mode, a Wi-Fi mode, and a wire-based mode for initiating the call. The method then provides the call using the selection of the access mode.

In an alternate embodiment, the present disclosure discloses a method and apparatus for processing a call request destined to a user. For example, the method receives via a network element a call request for setting up a call directed towards the user, wherein the user is registered with a tri-mode mobile endpoint device, wherein the tri-mode mobile endpoint device is capable of operating in a cellular mode, a Wi-Fi mode, and a wire-based mode for receiving the call. The method determines a current selection of an access mode by the user, and provides the call via a connection corresponding to the selection.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for enabling access to various network services using a single tri-mode device. Although the present disclosure is discussed below in the context of wireless networks, the present disclosure is not so limited. Namely, the present disclosure can be applied on any networks that would benefit from usage of an endpoint device that supports a variety of access standards.

Figure 1:
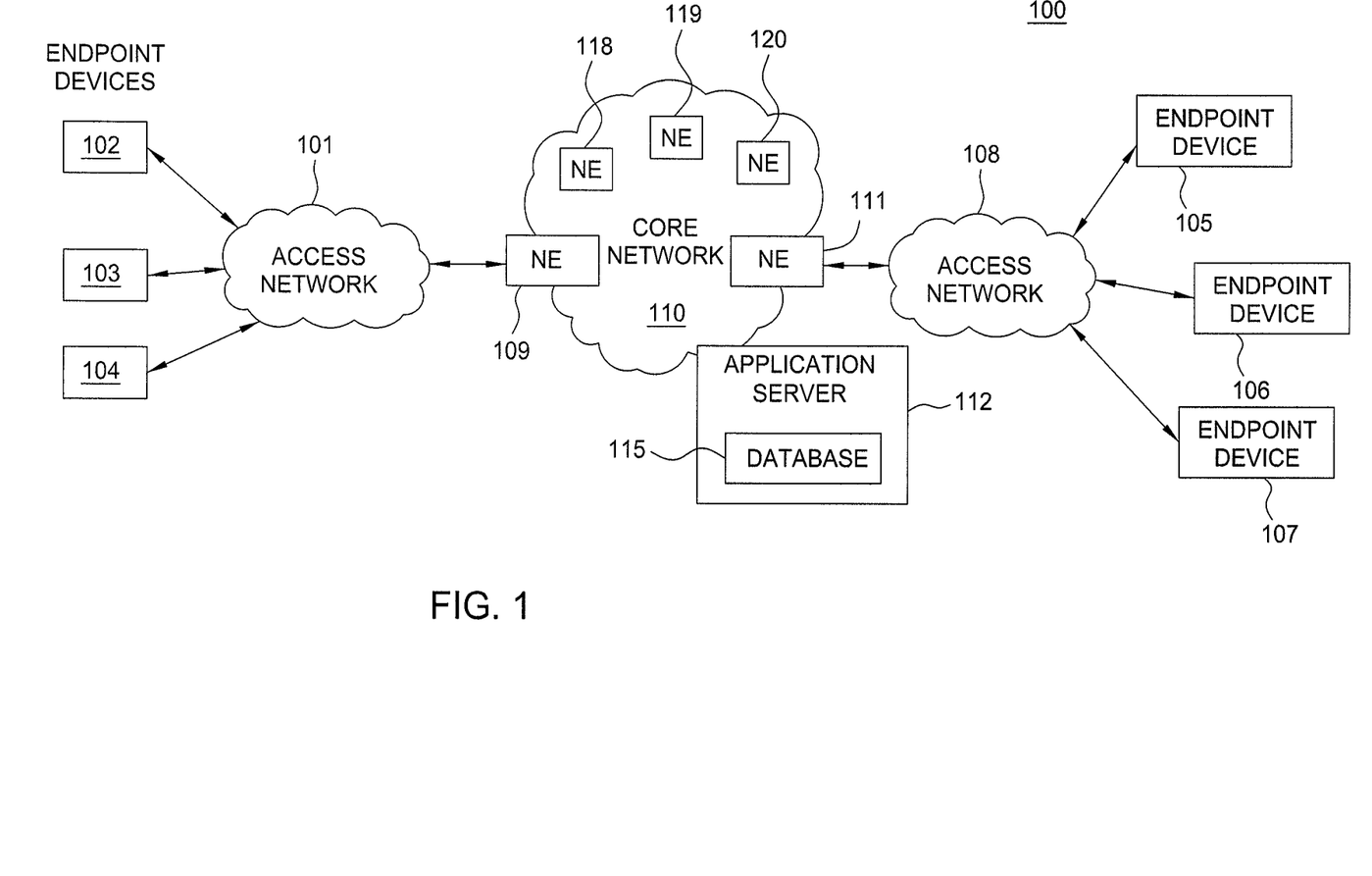
FIG. 1 illustrates an illustrative architecture for accessing a network service.

FIG. 1 illustrates an exemplary network 100 for accessing a network service related to the present disclosure. Exemplary networks include packet networks, Internet protocol (IP) networks, Public Switched Telephone Networks (PSTN), various access networks, and the like. An IP network is broadly defined as a network that uses Internet Protocol such as IPv4 or IPv6 and the like to exchange data packets.

In one embodiment, the network may comprise a plurality of endpoint devices 102-104 configured for communication with the core network 110 (e.g., an IP based core backbone network such as Internet Protocol (IP) Multimedia Subsystem (IMS) network and the like, supported by a service provider) via an access network 101. Similarly, a plurality of endpoint devices 105-107 are configured for communication with the core network 110 via an access network 108. The network elements 109 and 111 may serve as gateway devices, e.g. servers or edge routers for the core network 110.

The endpoint devices 102-107 may comprise customer endpoint devices such as personal computers, laptop computers, Personal Digital Assistants (PDAs), servers, routers, wire-based phones, wireless phones, cellular phones, smart phones, and the like.

The access networks 101 and 108 serve as a conduit to establish a connection between the endpoint devices 102-107 and the NEs 109 and 111 of the core network 110. The access networks 101 and 108 may each comprise a Digital Subscriber Line (DSL) network, a broadband cable access network, a Local Area Network (LAN), a wireless local area network (WLAN), a Wireless Access Network (WAN), a cellular network, a $3^{rd}$ party network, and the like. The access networks 101 and 108 may be either directly connected to NEs 109 and 111 of the core network 110, or indirectly through another network.

A wireless access network 101 or 108 may support a wireless service, e.g., Wi-Fi (Wireless Fidelity), WiMAX (Worldwide Interoperability for Microwave Access), 2G, 3G, or LTE (Long Term Evolution) or other 4G wireless services, and the like. Broadly defined, Wi-Fi is a wireless local area network (WLAN) technology based on the Institute of Electrical & Electronics Engineers (IEEE) 802.11 standards. WiMAX is a wireless metropolitan area network (MAN) technology based on the Institute of Electrical & Electronics Engineers (IEEE) 802.16 standards. 2G is a second generation cellular network technology, 3G is a third generation cellular network technology, and 4G is a fourth generation cellular network technology. Global System for Mobile (GSM) communications is an example of a 2G cellular technology, Universal Mobile Telecommunications System (UMTS) is an example of a 3G cellular network technology, and an LTE is an example of a 4G cellular network technology. It should be noted that the present disclosure is not limited to a particular type of wireless service.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, a router, or like device. The core network 110 also comprises an application server 112 that contains a database 115. The application server 112 may comprise any server or computer that is well known in the art, and the database 115 may be any type of electronic collection of data that is also well known in the art. It should be noted that although only six endpoint devices, two access networks, five network elements, and one application server are depicted in FIG. 1, the communication network 100 may be expanded by including additional endpoint devices, access networks, network elements, and application servers without altering the scope of the present disclosure.

The above communication network is described to provide an illustrative environment in which packets for various services are transmitted on networks. In one embodiment, a service provider may wish to enable customers (broadly users) to access services from a variety of networks. For example, enterprise customers may have services that are accessed from a network service provider and services that are developed and accessed only from within the enterprise network. The service may be a wireless network based service or a network wire-based service. In addition, the network through which the service is accessed may be a wireless network or a wire-based network. Hence, a user may access a variety of services from a variety of networks using a variety of network devices. For example, an enterprise user may have a wire-based phone on a desk, a soft-phone on a computer, and a cellular phone. Depending on the service being accessed, the user may select the appropriate end-device. In one embodiment, a user may have a need to access the variety of services via a wireless device without being tied to a desk. That is, the user may have a need for mobility while being able to access services.

The need for mobility has led some enterprise customers to extend services developed for the enterprise network to wireless devices. For example, an enterprise customer may develop a client application that emulates the wire-based service experience of an enterprise network. The client application may then be implemented on one or more wireless devices. However, the client application typically supports the enterprise service on a wireless device with dual mode access: access via a cellular network, or access via a Wi-Fi network. Based on the type of access technology that is available, the user then must use a corresponding phone. In one example, a Wi-Fi device may be used to access enterprise services over a Wi-Fi corporate network (e.g., an enterprise campus network). In another example, a cellular phone may be used to access enterprise services over a cellular network, while the user is accessing services from a location within the range of a cellular network but outside of the range of the enterprise's Wi-Fi network. In another example, if the access technology is wire-based, the customer may use a Time-Division Multiplexed (TDM) or Internet Protocol (IP) based phone. Thus, the customer ends up with multiple phones to be selectively used, based on the customer's physical location. That means, extending the enterprise services for increased mobility, forces the user to carry multiple phones that support different access technologies.

In one embodiment, the current disclosure provides a method and apparatus for accessing a service using a single endpoint device, wherein the endpoint device is a tri-mode device. A tri-mode device refers to a device that is able to operate in a cellular mode, a Wi-Fi mode, and a wire-based mode for a telephone call.

In one embodiment, the method provides a client application for the tri-mode device that can be used to make a call via a mode supported by the tri-mode device. For example, the client application may be used with any one of the Wi-Fi, cellular or wire-based access technologies. That is, the customer may initiate or receive a telephone call using the same client application regardless of whether the customer is using a wireless (Wi-Fi or cellular) or a wire-based access network.

Using one of the access modes supported by the tri-mode device, the customer is then be able to initiate a call or receive a call to or from a variety of locations. In one example, the customer may be away from the customer's desk but may be located within the Wi-Fi coverage area of the enterprise's Wi-Fi network. The customer may then use the Wi-Fi mode of the tri-mode device to access network services. To illustrate, the customer may be working within the enterprise campus. The enterprise may have Wi-Fi coverage to support mobility within the campus. The customer may then use the Wi-Fi mode of the tri-mode device for calls from within the coverage area of the Wi-Fi network.

In another example, the customer is located outside the coverage area of the Wi-Fi network but is within a coverage area of a cellular network. The customer may then receive or initiate the call using the cellular mode of the tri-mode device. In other words, the customer is able to use the cellular mode of the tri-mode device over a cellular network to access network services.

In yet another embodiment, the tri-mode device has an interface for supporting wire-based access to network services. For example, the customer may use the tri-mode device in a wire-based mode from the customer's office, a hotel location, another enterprise site, and so on. The wire-based call, for instance, may be over a broadband service such a cable or digital subscriber line (DSL) service. In one example, the customer, via an interface or a docking station, may connect the tri-mode device to a laptop or a desktop computer and use the wire-based access mode. It should be noted that in one embodiment, the docking station can be connected to an access network directly without the need of the computer.

For example, the tri-mode device may interact with a docking station or cradle with a port for accessing services via a wire-based connection. For example, if the customer is at a desk, the customer may use the wire-based mode of the tri-mode device with the appropriate interface, e.g., the port on the docking station/cradle, and so on, to initiate or receive a call.

In one embodiment, the cradle/docking station may have a multi-function indicator light. For example, a multi-function indicator light can be used to indicate when the tri-mode device is docked, charging, fully charged, in use, on standby, etc.

In one embodiment, the cradle/docking station may have various ports for connectivity. In one embodiment, the ports comprise one or more of: a Universal Serial Bus (USB) port, an Ethernet jack, an RJ-11 jack for accessing wire based networks, etc.

In one embodiment, the cradle/docking station may have features that are specialized for a particular environment. For example, a cradle specialized for a residential environment may have a speaker phone feature, an intercom feature for working with other phones in the user's residence, a hold button, a mode selection button that allows the user to undock the device without dropping a call in progress, a handover button that allows the user to change the mode without dropping a call in progress, and so on.

In one embodiment, the cradle/docking station may have features that are specialized for an office environment. For example, a cradle specialized for an office environment may have a speaker phone feature, an intercom feature for working with other phones in the office environment, a hold button, a mode selection button that allows the user to undock the device without dropping a call in progress, a handover button that allows the user to change the mode without dropping a call in progress, a call transfer button, e.g., to a voicemail system, a Do Not Disturb button, a three way conference button, and so on.

Although, the above description separates some features as being appropriate for a residential environment versus an office environment, the present method and apparatus are not so limited. The type of features to be configured for the cradle/docking station can be selectively determined by the user and/or the service provider. For example, a Do Not Disturb button can be added as a feature for a residential use. As such, the above description is not intended to limit the disclosure to a specific implementation.

Figure 2:
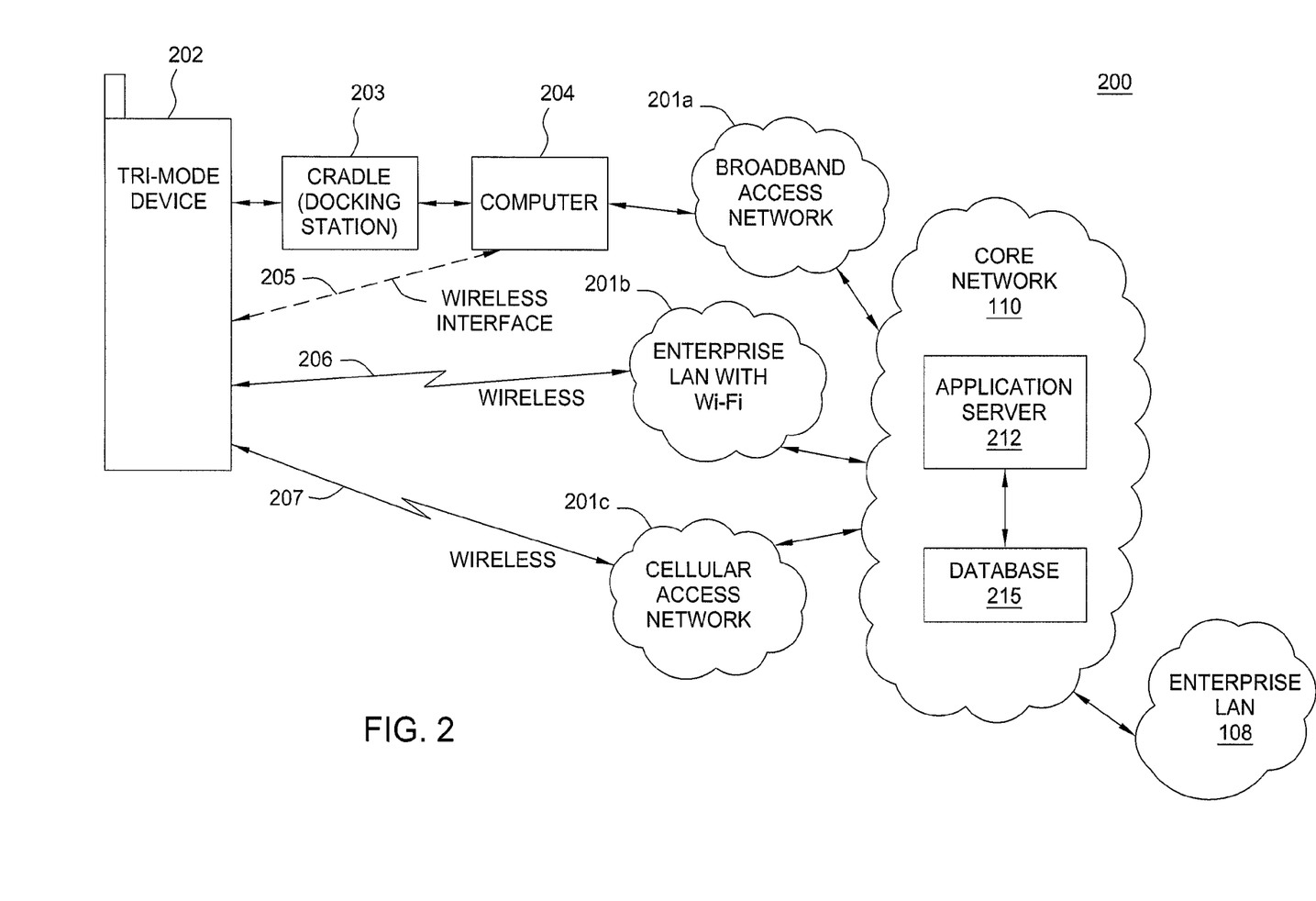
FIG. 2 illustrates an exemplary network for accessing a service using a tri-mode device.

FIG. 2 illustrates an exemplary network 200 for accessing a service using a tri-mode device. The network 200 comprises a tri-mode mobile endpoint device 202 communicating with the core network 110 and an enterprise LAN 108 via a broadband access network 201a, an enterprise Wi-Fi access network 201b, or a cellular access network 201c.

The core network 110 also comprises an application server 212 and a database 215. In one embodiment, the network service provider implements the method for enabling a customer to access services using a single tri-mode device in the application server 212. For example, the network service provider enables an enterprise customer to use client applications in the tri-mode mobile endpoint device 202 to interact with the core network 110 to access various network services.

In one embodiment, the tri-mode mobile endpoint device 202 reaches the enterprise Wi-Fi access network 201b and the cellular access network 201c via wireless connections 206 and 207, respectively. The tri-mode mobile endpoint device 202 reaches the broadband (cable or DSL network) access network 201a via a wire-based connection. In one embodiment, the wire-based connection between the tri-mode mobile endpoint device 202 and the broadband access network 201a is a connection via a cradle or a docking station 203 and a computer 204. In another embodiment, the wire-based connection between the tri-mode mobile endpoint device 202 and the broadband access network 201a is a connection via an interface 205 (e.g., a communication cable) and the computer 204. It should be noted that in one embodiment, the docking station can be connected to an access network directly without the need of the computer.

In operation, the customer may then select a mode to initiate and/or receive calls from the enterprise LAN 108. For example, based on the customer's location, the customer may select one of: the wire-based mode, the Wi-Fi mode or the cellular mode. The customer may then receive and initiate calls using the selected mode which is supported by the client application. It should be noted that the customer may in fact select more than one mode, e.g., a sequence of modes (e.g., the wire-based mode first, followed by the Wi-Fi mode second, and followed by the cellular mode last). In other words, a customer can define a sequence of available access modes depending on a particular environment or the preference of the customer as further discussed below.

To illustrate, in one example, a particular location may have access to a wire-based connection. In turn, the customer may then connect the tri-mode mobile endpoint device 202 to the computer 204 either through the cradle/docking station 203 or the interface 205. The customer may then select the wire-based mode of the tri-mode mobile endpoint device 202. The customer then receives or initiates calls to/from enterprise LAN 108 via the computer 204, the broadband access network 201a, and the core network 110.

In one example, the customer may be at a location served by the enterprise Wi-Fi access network 201b. That is, the customer may be located within the Wi-Fi coverage area of the enterprise's Wi-Fi network 201b. The customer may then select the Wi-Fi mode for calls to and from the customer.

In another example, the customer may be located within the coverage area of the cellular network 201c but outside the coverage area of the enterprise Wi-Fi network. The customer may then use the cellular mode of the tri-mode mobile endpoint device to receive or send calls over a cellular network.

The tri-mode mobile endpoint device described above may detect more than one type of signal at a location. For example, the customer may be at a location within the coverage area of both the enterprise Wi-Fi network and the cellular network. In one embodiment, the current method provides a priority assignment for selecting a mode for the tri-mode mobile endpoint device 202. For example, if both Wi-Fi and cellular networks cover a location, the method may select the Wi-Fi mode. In another example, the method may select the cellular mode. In yet another example, the method may switch between the two modes depending on availability, cost, speed, bandwidth, quality of the access, e.g., a Quality of Service (QoS) measure and the like.

In yet another example, the priority assignment may actually select a wire-based mode as the first priority, the Wi-Fi mode as the second priority, and the cellular mode as the third priority. For example, if the wire-base, cellular and Wi-Fi modes are all available at a location, the method will select the wire-based mode first. If the wire-based mode is not available, but both Wi-Fi and cellular modes are available, the method then selects the Wi-Fi mode and so on.

In one embodiment, the priority assignment for selecting a mode for the tri-mode mobile endpoint device is configurable by the customer. For example, the customer may have unlimited minutes for cellular access and may prefer to use the cellular mode whenever cellular network coverage is available. In another example, the customer may incur per minute charges while using cellular mode but may have minimal cost for using the Wi-Fi mode. In that scenario, the customer may prefer using the Wi-Fi mode when Wi-Fi coverage is available and use the cellular mode only when the Wi-Fi coverage is not available.

In one embodiment, the tri-mode device operates in all three modes simultaneously. For example, the customer may wish to be able to change the customer's physical location while a call is in-progress. For example, the customer may move from a location that has Wi-Fi coverage to a location that has cellular coverage. Then, the call that is already in-progress will need to be switched from the Wi-Fi mode to the cellular mode. The tri-mode mobile endpoint device's ability to operate in all three modes simultaneously may then be leveraged to seamlessly switch from the Wi-Fi mode to the cellular mode. In one embodiment, the tri-mode mobile endpoint device has the capability to switch from one of the three modes to any one of the other three modes.

Figure 3:
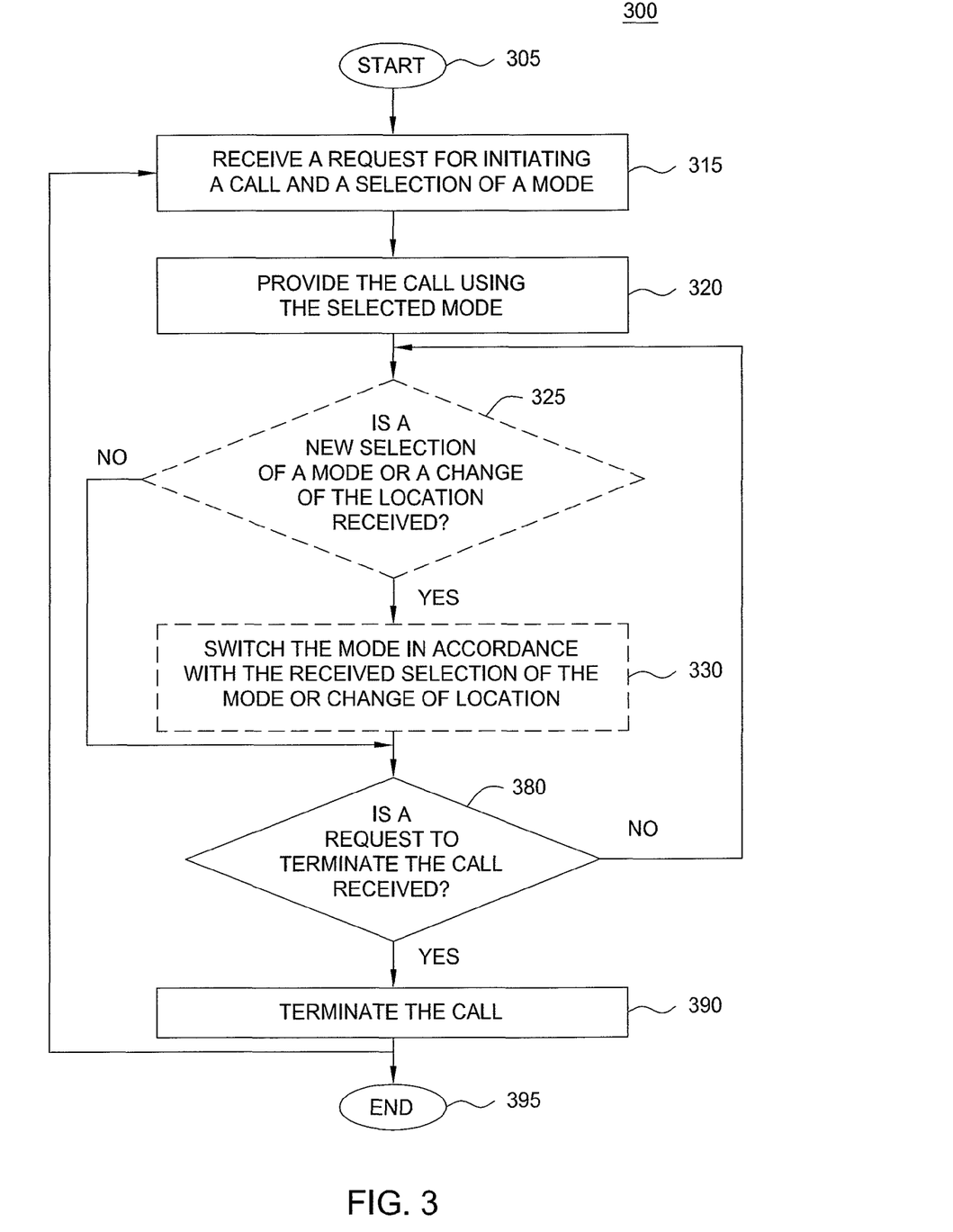
FIG. 3 illustrates a flowchart of a method for initiating a call by a customer.

FIG. 3 illustrates a flowchart of a method 300 for accessing a service of the present disclosure for initiating a call by a customer. For example, one or more steps of method 300 can be implemented in an endpoint device, wherein the endpoint device is a tri-mode mobile endpoint device. In one embodiment, the customer or service provider has implemented a client application in the tri-mode mobile endpoint device. The client application supports Wi-Fi, cellular and wire-based modes for accessing network services, e.g., initiating or receiving telephone calls. Method 300 starts in step 305 and proceeds to step 315.

In step 315, method 300 receives a request for initiating a call and/or a selection of a mode. For example, the method in the tri-mode mobile endpoint device may receive a request for initiating a call and a selection of a particular access mode from the customer, where the tri-mode mobile endpoint device is able to be operated by the customer in a cellular mode, a Wi-Fi mode, and/or a wire-based mode. The selection of the mode indicates which one of the Wi-Fi, cellular or wire-based modes that the customer has selected for the call.

In one embodiment, the selection may be performed automatically by the tri-mode mobile endpoint device based on the location of the device. For example, the tri-mode device may be pre-configured to make the selection automatically based on the type of access that is available at a location. For example, the method may be pre-configured to select the wire-based mode while the user is at the office/desk. In another example, the selection is further made in accordance with a priority list defined by the customer. In yet another example, the selection can be made on a per call basis, e.g., a customer can selectively override the priority list that was previously defined on a per call basis without having to reconfigure the priority list. For example, a customer may be in the office and the priority list defines that the wire-based mode should be used for initiating a call when the customer is in the office, but the customer can override that by initiating the call while selecting the cellular mode, e.g., the customer may not want the called party to know that the customer is in the office via a caller ID function and so on.

In step 320, method 300 provides the call using the selected mode. For example, the method may initiate the call using the selected mode, e.g., the Wi-Fi mode, the cellular mode, or the wire-based mode. The method then proceeds to optional step 325.

In optional step 325, method 300 determines if a new selection of a mode or a change of the location is received. In one example, the user may remove the tri-mode mobile endpoint device (which was connected via wire-based mode) from its cradle (or docking station) and proceed to another location in the coverage area of the Wi-Fi network. In another example, the user may update the request for the call (e.g., the request associated with a call in-progress), wherein the update includes a change of a selected mode. If a new selection of a mode or a change of the location is received, the method proceeds to optional step 330. Otherwise, the method proceeds to step 380.

In optional step 330, method 300 switches the mode in accordance with the received selection of the mode or change of location. For example, the tri-mode mobile endpoint device may establish a different connection for the call via the newly selected mode. For example, the method may add a Wi-Fi connection simultaneously with the wire-based connection. The method may then discontinue using the previously selected mode, in favor of the newly selected mode. That is, the change to the newly selected mode is made seamlessly. The method then proceeds to step 380.

In step 380, method 300 determines if a request to terminate the call is received. For example, the user may wish to end the call. If a request to terminate the call is received, the method proceeds to step 390. Otherwise, the method proceeds to step 325.

In step 390, method 300 terminates the call and proceeds to step 395 to end processing the current request or returns to step 315 to continue receiving more requests.

Figure 4:
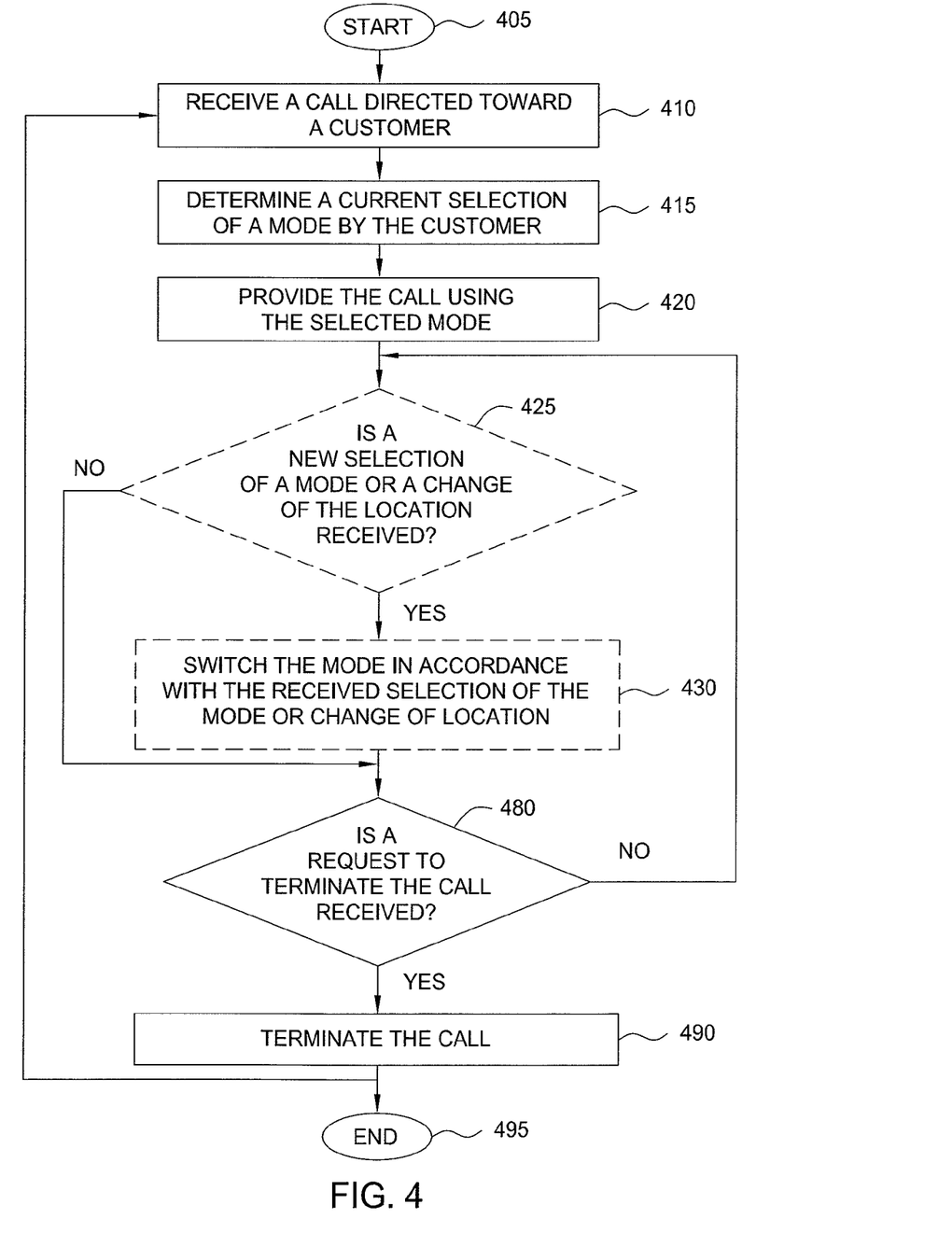
FIG. 4 illustrates a flowchart of a method for processing a call destined to a customer.

FIG. 4 illustrates a flowchart of a method 400 for accessing a service of the present disclosure for processing a call destined to a customer. For example, one or more steps of method 400 can be implemented in a call control element or an application server residing in a network for supporting calls to a customer with a tri-mode mobile endpoint device. Method 400 starts in step 405 and proceeds to step 410.

In step 410, method 400 receives a call directed towards a customer. For example, the method deployed in a network element, e.g., a call control element, a call control function or an application server, receives a call request to setup a call directed towards a customer who has registered the use of a tri-mode mobile endpoint device with the network, where the tri-mode mobile endpoint device is capable of supporting calls via a Wi-Fi mode, a cellular mode or a wire-based mode.

In step 415, method 400 determines a current selection of a mode by the customer. For example, the customer may have previously indicated a selection of an access mode when the tri-mode mobile endpoint device was previously registered with the network or via a user profile stored by the network. For example, the user profile may contain various mode-based rules previously specified by the customer. For example, the customer may have provided a rule stating that if the tri-mode mobile endpoint device is detected to be in its cradle, then the selection of the mode is wire-based, and so on. Alternatively, the user can specify the mode selection based on the time of day, the location of the user, the availability of the access type at a particular location and so on.

In step 420, method 400 provides the call using the selected mode. For example, the method may forward a call towards the customer using the selected mode, e.g., the Wi-Fi mode via an enterprise LAN, the cellular mode via a cellular access network, or the wire-based mode via a broadband access network. The method then proceeds to optional step 425.

In optional step 425, method 400 determines if a new selection of a mode or a change of the location is received. In one example, the user may remove the tri-mode device (which was connected via wire-based mode) from its cradle (or docking station) and proceed to another location in the coverage area of the Wi-Fi network. In another example, the user may initiate a mid-call request to change the access mode (e.g., the request is associated with a call in-progress). If a new selection of a mode or a change of the location is received or detected, the method proceeds to optional step 430. Otherwise, the method proceeds to step 480.

In optional step 430, method 400 switches the mode in accordance with the received selection of the mode or change of location. For example, the call control element or function will establish a different connection for the call via the newly selected mode. For example, the method may add a Wi-Fi connection simultaneously with the wire-based connection. The method may then discontinue using the previously established connection, in favor of the newly established connection by performing a handover function. That is, the change to the newly selected mode is made seamlessly. The method then proceeds to step 480.

In step 480, method 400 determines if a request to terminate the call is received. For example, the customer or the calling party may wish to end the call. If a request to terminate the call is received, the method proceeds to step 490. Otherwise, the method proceeds to step 425.

In step 490, method 400 terminates the call and proceeds to step 495 to end processing the current call request or returns to step 410 to continue processing other calls.

It should be noted that although not specifically specified, one or more steps of methods 300 and 400 may include a storing, displaying and/or outputting step as required for a particular application. In other words, any data, records, fields, and/or intermediate results discussed in the method 300 or method 400 can be stored, displayed and/or outputted to another device as required for a particular application. Furthermore, steps or blocks in FIG. 3 or FIG. 4 that recite a determining operation, or involve a decision, do not necessarily require that both branches of the determining operation be practiced. In other words, one of the branches of the determining operation can be deemed as an optional step.

Figure 5:
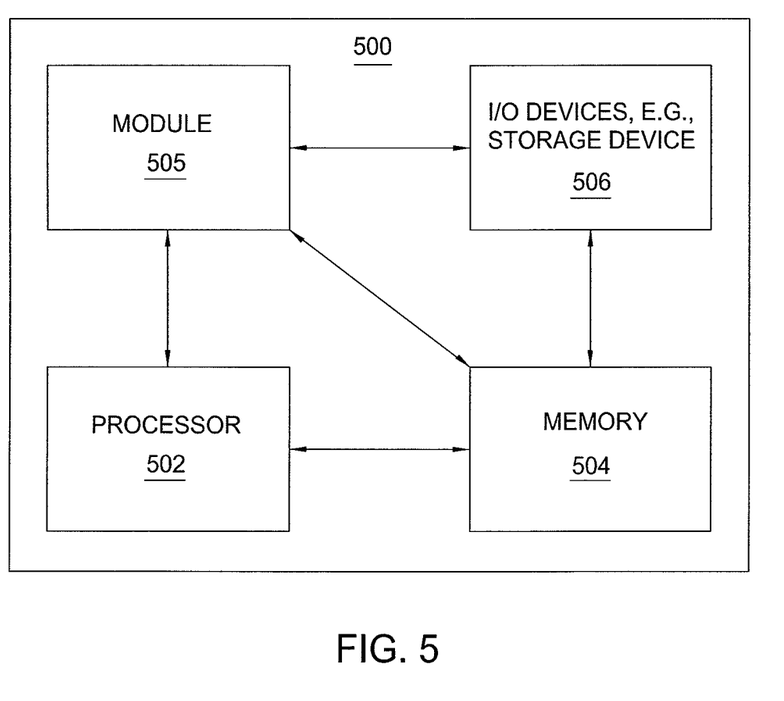
FIG. 5 illustrates a high-level block diagram of a general purpose computer suitable for use in performing the functions described herein.

FIG. 5 depicts a high level block diagram of a general purpose computing device suitable for use in performing the functions described herein. As depicted in FIG. 5, the system 500 comprises a processor element 502 (e.g., a CPU), a memory 504, e.g., random access memory (RAM) and/or read only memory (ROM), a module 505 for initiating a call or processing a call destined to a user, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)). Thus, system 500 may broadly represent a mobile endpoint device or a network element such as a call control element.

It should be noted that the present disclosure can be implemented in software and/or in a combination of software and hardware, e.g., using application specific integrated circuits (ASIC), a general purpose computer or any other hardware equivalents. In one embodiment, the present module or process 505 for initiating a call or processing a call destined to a user can be loaded into memory 504 and executed by processor 502 to implement the functions as discussed above. As such, the present process 505 for initiating a call or processing a call destined to a user (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for initiating a call, comprising:
receiving by a tri-mode mobile endpoint device, a request for initiating a call from a user, and a selection of an access mode of the call from the user, wherein the selection is in accordance with a priority assignment, wherein the tri-mode mobile endpoint device is capable of operating in each of: a cellular mode, a wireless local area network mode, and a wire-based mode for initiating the call, wherein the wire-based mode is implemented via a cradle for coupling with the tri-mode mobile endpoint device, wherein the cradle has a handover user interface feature;
providing, by the tri-mode mobile endpoint device, the call using the selection of the access mode as received from the user; and
switching the access mode of the call, by the tri-mode mobile endpoint device, in response to a request to change the access mode of the call, wherein the request is made via the handover user interface feature of the cradle.

2. The method of claim 1, wherein the priority assignment defines the wire-based mode as a first priority, the wireless local area network mode as a second priority, and the cellular mode as a third priority.

3. The method of claim 1, wherein the priority assignment is configurable by the user.

4. The method of claim 1, wherein the tri-mode mobile endpoint device operates in two of the cellular mode, the wireless local area network mode, and the wire-based mode simultaneously.

5. The method of claim 1, wherein the tri-mode mobile endpoint device has a capability to switch between the cellular mode, the wireless local area network mode, and the wire-based mode.

6. The method of claim 1, wherein the cradle further comprises a multi-function indicator light.

7. The method of claim 1, wherein the cradle further comprises a port for connectivity.

8. The method of claim 1, wherein the cradle further comprises a call transfer feature.

9. The method of claim 1, wherein the cradle further comprises a three way conference feature.

10. A method for processing a call request destined to a user, comprising:
receiving by a network element, a call request for setting up a call directed towards the user, wherein the user is registered with a tri-mode mobile endpoint device, wherein the tri-mode mobile endpoint device is capable of operating in each of: a cellular mode, a wireless local area network mode, and a wire-based mode for receiving the call, wherein the wire-based mode is implemented via a cradle for coupling with the tri-mode mobile endpoint device, wherein the cradle has a handover user interface feature;
determining, by the network element, a selection of an access mode of the call in accordance with a priority assignment of the user;
providing, by the network element, the call via a connection corresponding to the selection; and
receiving, by the network element, a request to change the access mode of the call, wherein the request is made via the handover user interface feature of the cradle.

11. The method of claim 10, wherein the priority assignment defines the wire-based mode as a first priority, the wireless local area network mode as a second priority, and the cellular mode as a third priority.

12. The method of claim 10, wherein the priority assignment is configurable by the user.

13. The method of claim 10, wherein the tri-mode mobile endpoint device operates in two of the cellular mode, the wireless local area network mode, and the wire-based mode simultaneously.

14. The method of claim 10, wherein the tri-mode mobile endpoint device has a capability to switch between the cellular mode, the wireless local area network mode, and the wire-based mode.

15. A tangible computer-readable storage medium storing a plurality of instructions which, when executed by a processor of a network element, cause the processor to perform operations for processing a call request destined to a user, the operations comprising:
receiving a call request for setting up a call directed towards the user, wherein the user is registered with a tri-mode mobile endpoint device, wherein the tri-mode mobile endpoint device is capable of operating in each of: a cellular mode, a wireless local area network mode, and a wire-based mode for receiving the call, wherein the wire-based mode is implemented via a cradle for coupling with the tri-mode mobile endpoint device, wherein the cradle has a handover user interface feature;

determining a selection of an access mode of the call in accordance with a priority assignment of the user;

providing the call via a connection corresponding to the selection; and receiving a request to change the access mode of the call, wherein the request is made via the handover user interface feature of the cradle.

16. The tangible computer-readable storage medium of claim 15, wherein the priority assignment is configurable by the user.

* * * * *